March 6, 1928.
M. B. JACKSON
CHANGE SPEED GEARING
Filed Nov. 10, 1924
1,661,613
3 Sheets-Sheet 1
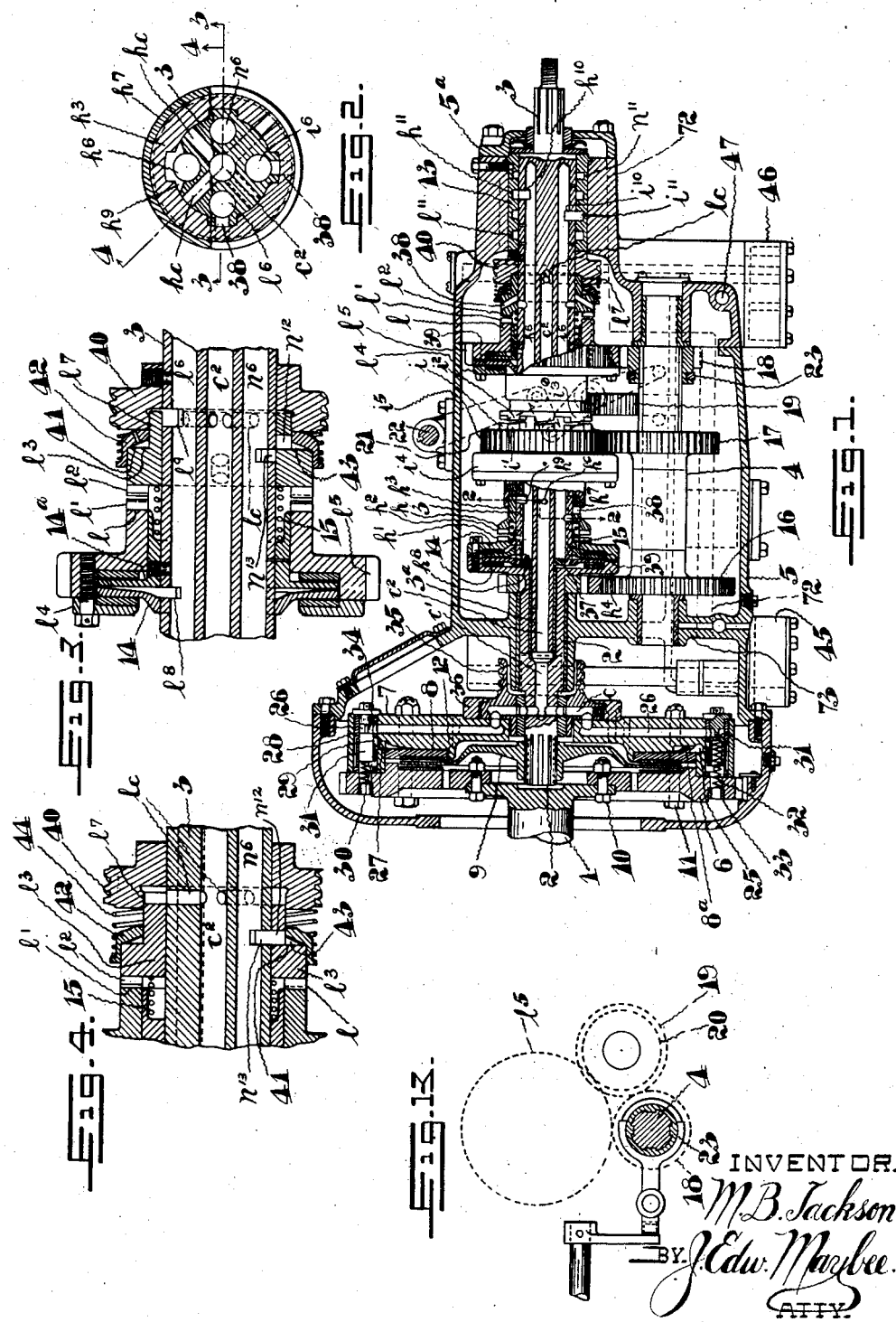
INVENTOR.
M. B. Jackson
BY J. Edw. Maybee
ATTY.

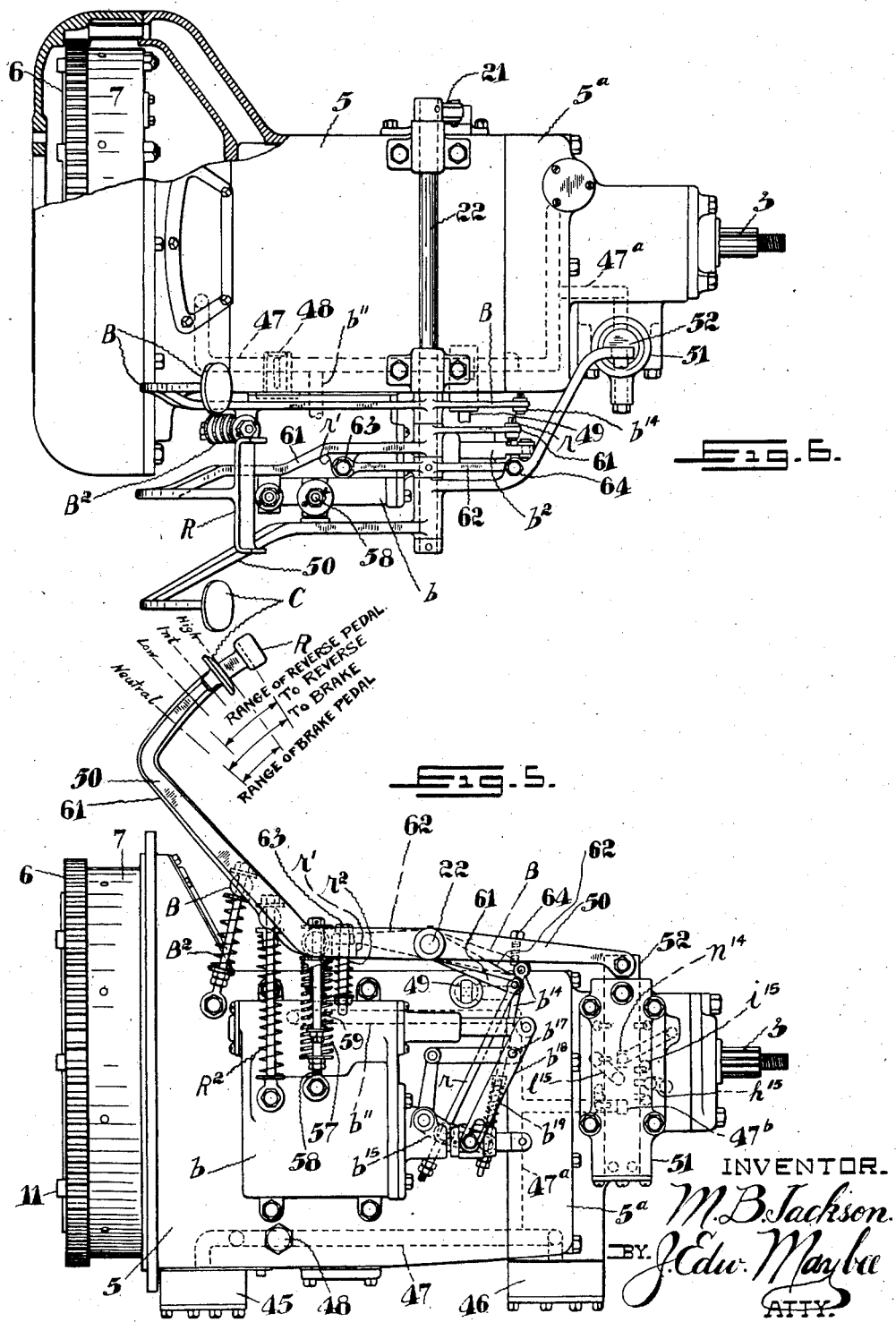

March 6, 1928.  1,661,613
M. B. JACKSON
CHANGE SPEED GEARING
Filed Nov. 10, 1924   3 Sheets-Sheet 3
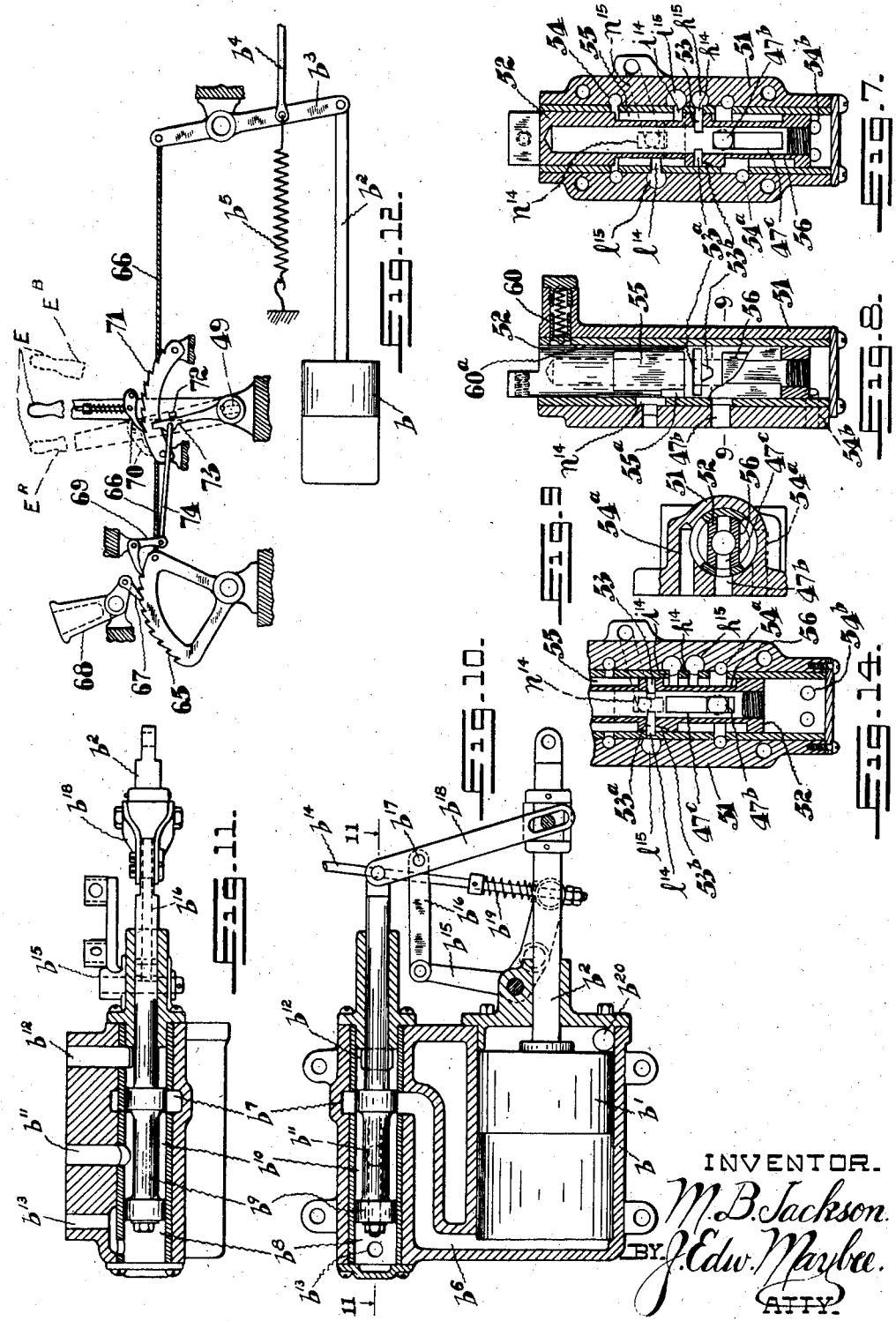
INVENTOR.
M. B. Jackson
BY J. Edw. Maybee
ATTY.

Patented Mar. 6, 1928.

1,661,613

UNITED STATES PATENT OFFICE.

MAUNSELL B. JACKSON, OF TORONTO, ONTARIO, CANADA, ASSIGNOR OF ONE-THIRD TO EDWARD McMAHON AND ONE-THIRD TO THOMAS CAMERON BATE, BOTH OF OTTAWA, CANADA.

CHANGE-SPEED GEARING.

Application filed November 10, 1924. Serial No. 748,992.

This invention relates to change speed gearing and more particularly to that type used in automobiles for changing the gear ratio between the engine and transmission shafts and for reversing the direction of rotation of the latter relative to the former as shown in my co-pending application No. 654,160, filed July 27th, 1923. The object of the present invention is to provide apparatus of this character which may be easily operated and in which the various gear ratios are automatically attained by the operation of a lever working in a single vertical plane. Other objects I have in mind will hereinafter appear.

I attain my objects by means of the constructions hereinafter described and illustrated in the accompanying drawings in which Fig. 1 is a longitudinal section of my improved clutch and gear box;

Fig. 2 a cross section, on an enlarged scale, of the transmission shaft on the line 2—2 in Fig. 1;

Fig. 3 a sectional detail, on an enlarged scale of the low speed jaw clutch;

Fig. 4 a sectional detail on the line 4—4 in Fig. 2 and with the jaw clutch engaged;

Fig. 5 a side elevation of the complete gear box with the pedal levers in their normal positions and the brake actuating mechanism, except its pedal lever, shown in the "on" position, this being the position of the parts after the brake has been fully applied and before the brake cylinder has been refilled;

Fig. 6 a plan view of Fig. 5;

Fig. 7 a vertical section of the control valve;

Fig. 8 a view similar to Fig. 7 taken at right angles thereto and showing the plunger valve partly in side elevation;

Fig. 9 a cross section on the line 9—9 in Fig. 8;

Fig. 10 a longitudinal vertical section of the brake cylinder showing the parts thereof in their positions when the brake is off;

Fig. 11 a horizontal section on the line 11—11 in Fig. 10;

Fig. 12 a view showing the mechanism for holding off the brakes when it is desired to tow the vehicle;

Fig. 13 a detail in end elevation of the forward and reverse gearing;

Fig. 14 a sectional detail of the parts shown in Fig. 7 in another position.

In the constructions hereinafter described the various parts for operating the different mechanism for obtaining the high, intermediate and low gear ratios are indicated by letters of reference $h$, $i$ and $l$ respectively. Similar parts in the different mechanisms have the same reference numeral after their reference letter so that the letter gives the key to the specific gear ratio mechanism the part is associated with and the numeral indicates the part.

1 is the crankshaft of an engine; 2 is a clutch shaft; 3 is the transmission shaft which is adapted to be connected to the driving wheels of a vehicle by any suitable driving connection, the shafts 1, 2 and 3 are in alinement with one another; 4 is a countershaft; and 5 is the transmission casing in which the transmission shaft and countershaft are journalled. To the rear end of the crankshaft 1 a clutch is secured so that the latter also serves as a flywheel. The clutch comprises the flywheel 6, the clutch member 7, the clutch ring 8 and the clutch disk 9. The flywheel 6 is provided with teeth adapted to mesh with the pinion of an electric starting device (not shown) and also adapted for another purpose hereinafter described. Bolts 10 secure the flywheel to a flange formed on the crankshaft 1 and bolts 11 passing through the clutch member and the flywheel hold these parts together. The side of the clutch member 7, adjacent the flywheel 6, is provided with an annular recess 12 adapted to receive the clutch ring 8 so that the latter may be axially moved therein. The ring is provided with a plurality of jaws or projections 8ª engaged with similar projections formed on the clutch member 7 so that the ring will be driven thereby.

The clutch disk 9 is splined on the clutch shaft 2 so that the disk may be axially moved thereon. The clutch facings are carried by the clutch ring 8 and the flywheel 6. From this description it is evident that the clutch disk and thus the clutch shaft 2 may be given a driving connection with the clutch by moving the clutch ring towards the flywheel to frictionally engage the disk between them. The means for accomplishing this will hereinafter be described.

The forward end 3ª of the transmission shaft is turned down and journalled in a bushing carried within the rear end of the clutch shaft 2 while the rear end of the transmission shaft is journalled in a bushing 13 carried in the rear end $5^a$ of the casing 5.

The end of the clutch shaft 2, remote from the clutch disk 9, is provided with a jaw clutch $h$ adapted to form a direct driving connection between the clutch shaft 2 and the transmission shaft 3. This clutch is provided with teeth or jaws $h^1$ adapted to be meshed with jaws $h^2$ formed on the sleeve $h^3$ which is splined on the transmission shaft 3, as hereinafter described, (see Fig. 1), so that the jaws $h^2$ may be meshed with the jaws $h^1$. A helical spring 15 engaging the sleeve and the member carrying the jaws $h^1$ tends to hold the jaws on the sleeve out of engagement with the jaws $h^1$.

It will be understood that the operation of the parts described will cause the transmission shaft to be rotated at crankshaft speed which, in the construction shown in the drawings, forms the highest speed ratio between these shafts. It will also be understood that before the jaws $h^1$ and $h^2$ are meshed and the main clutch thrown in to drive the jaws $h^1$, the vehicle and thus the transmission shaft are in motion which is accomplished by means of the low and intermediate gear speeds hereinafter described. To enable the jaws to be easily and quietly meshed a clutch $h^4$ is provided which is adapted to rotate or spin the jaws $h^1$. This clutch comprises two members secured together, one of which is formed on or secured to the clutch shaft 2, the other member carries the jaws $h^1$ of the clutch $h$. The clutch $h^4$ is provided with spaced clutch surfaces formed as friction rings and adapted to frictionally engage the adjacent clutch surfaces of a pair of clutch disks 14 splined on the transmission shaft 3. From this it is obvious that by spreading the disks 14 apart, as hereinafter described, the clutch $h^4$ will spin the clutch shaft and thus the jaws $h^1$ to match the speed thereof with the jaws $h^2$ on the transmission shaft 3.

The countershaft 4 is driven by means of the constantly meshed gearing 16, one gear of which is secured to the clutch shaft 2 while the other gear is secured to or formed on the countershaft. The countershaft is provided with the gears 17 and 18, the former being constantly in mesh with a gear $i^5$ freely mounted on the transmission shaft 3. The gear 18 is splined on the countershaft and is adapted to be axially moved in one direction thereon to mesh with a gear $l^5$ freely mounted on the transmission shaft. To form the intermediate or low speed gear ratios between the clutch shaft and the transmission shaft, jaw clutches $i$ and $l$ are provided for respectively clutching the gear $i^5$ or the gear $l^5$ to the transmission shaft. These jaw clutches are similar in construction to the jaw clutch $h$ and are provided with jaws $i^1$ and $l^1$ carried by the gears $i^5$ and $l^5$ respectively. The jaws $i^1$ and $l^1$ are adapted to be respectively meshed with the jaws $i^2$ and $l^2$ which are carried by sleeves $i^3$ and $l^3$ similar to the sleeves $h^3$, these sleeves being also splined for axial movement on the transmission shaft 3. These clutches are also provided with the springs 15 tending to hold the jaws of each clutch out of engagement with one another. Clutches $i^4$ and $l^4$, similar in construction and operation to the clutch $h^4$, are provided for matching the speeds of the jaws of the clutches $i$ and $l$ before the sleeves are axially moved. The clutches $i^4$ and $l^4$ are secured to or formed on the gears $i^5$ and $l^5$ respectively and each of these clutches is provided with disks 14 and $14^a$, splined on the transmission shaft. The disks $14^a$ have hubs on which the gears $i^5$ and $l^5$ are journalled.

To reverse the direction or rotation of the transmission shaft the gear 18 is adapted to be shifted longitudinally on the countershaft to mesh with an idler gear 19 which carries a gear 20 constantly in mesh with the gear $l^5$. The gear 18 is shifted by means of the arm, link and lever arrangement 21, indicated in dotted lines in Fig. 1, the arm being connected to a transverse shaft 22 journalled on top of the transmission casing and the lever being connected by means of a forked arm 23 with the gear 18. The transverse shaft is adapted to be rocked by a foot pedal R as hereinafter described.

To actuate any one of the clutches $h^4$, $i^4$ or $l^4$ and its jaw clutch $h$, $i$ or $l$ and to also actuate the main clutch ring 8, I provide means for supplying fluid under pressure, which fluid pressure is controlled by a manually operated valve.

In the clutch member 7 is formed, by means of an annular groove, a fluid chamber 25 which communicates, behind the clutch ring 8, with the recess 12 formed in the clutch member. In the latter are formed the fluid passages 26 which are radially disposed in the clutch member and have their outer ends axially disposed therein and axially directed to form passages through the flywheel 6. These outer ends communicate with the interior of the casing 5. Openings 27 formed in the clutch member 7 form communications between the axially directed ends of the passages 26 and the fluid chamber 25. In each passage is fitted a valve body 28 having inlet and exhaust ports 29 and 30 communicating with the opposite ends of the passage 26 and with the opening 27. This is accomplished by forming the valve body as a tube and turning down the tube to form an annular recess between the ports. A piston valve 31 is slidably mounted in the valve body for controlling the ports. A spring 32 engaging the closed end of the piston valve and an annular abutment 33, formed in the exhaust end of the passage 26, tends to maintain the valve in position to close the inlet port and to open the exhaust port. This spring 32 is of sufficient strength to prevent the valve 31 being moved by the centrifugal action of the fluid in the passage 26. The inward movement of the piston valve is limited by a projection 34 suitably carried at the inlet end of the passage 26. When the valves are in this position the fluid in the chamber 25 is readily drained into the crankcase as all the drain openings and passages are farther from the center of the clutch than the chamber 25 and thus the centrifugal action of the fluid in the latter forces the liquid from the chamber.

The pressure of the fluid in the passage 26 is adapted to actuate the piston valve against its spring to open and close the inlet and exhaust ports respectively, whereby the fluid passes through the opening 27 into the chamber 25 and actuates the ring 8 to clutch the disk 9.

On the clutch shaft 2 is journalled the hub of a helical gear 35 which is provided with a flange having a suitable driving connection with the clutch member 7 so that the gear may be easily detached therefrom. The gear 35 is held against the side of the clutch member by means of a ring 36 secured to the latter, the ring being provided with an inwardly directed rim adapted to overhang and engage the flange on the gear. The flange of the gear is provided with passages $c$ which communicate with the radially disposed portions of the passages 26. A passage $c^1$ is axially formed in the clutch shaft 2 and this passage has two radially directed branches communicating with the passages $c$. The transmission shaft is provided with an axial passage $c^2$ extending through the forward end thereof and communicating with the passage $c^1$.

The transmission shaft 3 is also provided intermediate its ends with four longitudinal passages $h^6$, $i^6$, $l^6$ and $n^6$, the forward ends of these passages being plugged or closed at 37. These passages are arranged symmetrically in the shaft as shown in Figs. 1, 2 and 3 and the first three passages supply the fluid to actuate the spinning clutches $h^4$, $i^4$ and $l^4$, and the jaw clutches $h$, $i$ and $l$ respectively. The sleeves of the jaw clutches are formed as plungers adapted to reciprocate in open ended cylinders, the sleeves $h^3$ and $l^3$ being mounted in the cylinders $h^7$, and $l^7$. As the internal mechanisms of the clutches $i^4$ and $i$ are similar to the other corresponding clutches mounted on the transmission shaft they are not shown in section and will only be briefly described. The passage $h^6$ communicates by means of the ports $h^8$ and $h^9$ with the spinning clutch $h^4$ and the cylinder $h^7$, and also communicates by a port $h^{10}$ with an annular groove $h^{11}$ formed in the bushing 13. Ports $l^8$ and $l^9$ formed in the transmission shaft form communications between the passage $l^6$ and the spinning clutch $l^4$ and the cylinder $l^7$ respectively. The shaft is also provided with a port (not shown) forming a communication between the passage $l^6$ and an annular groove $l^{11}$ formed in the bushing 13. The passage $i^6$ also communicates by ports (not shown) with the clutches $i^4$ and $i$ and also by a port $i^{10}$ with an annular groove $i^{11}$ formed in the bushing 13. From this description it is obvious that when fluid under pressure is fed to any one of the annular grooves $h^{11}$, $i^{11}$ or $l^{11}$, the fluid will pass through the communicating passage and thus actuate both the spinning and jaw clutches in communication with that passage. This sets the transmission shaft for operation so that the vehicle will be driven when the main clutch is thrown in.

To ensure that the jaws of the jaw clutch $h$, $i$ or $l$ are meshed before the fluid enters the passage $c^2$ to operate the main clutch, the fluid is first passed into the cylinder of the desired jaw clutch and then into the passage $c^2$. This is accomplished by forming transversely arranged ports communicating with the cylinder of each jaw clutch and the passage $c^2$, each set of ports is normally covered by the sleeves of the jaw clutches. The ports $hc$ and $lc$, Figs. 1, 2, 3 and 4, formed in the transmission shaft and located between the passages $h^6$, $i^6$, $l^6$ and $n^6$, form communications between the cylinders $h^7$ or $l^7$ and the passage $c^2$ respectively when the sleeves $h^3$ or $l^3$ are moved to mesh their jaws $h^2$ or $l^2$ with the jaws $h^1$ and $l^1$ respectively. The cylinder of the jaw clutch $i$ also communicates with the passage $c^2$.

The ports $lc$ are so arranged relative to the sleeve $l^3$ that fluid will enter the passage $c^2$ immediately the sleeve is moved whereby the main clutch will rotate the jaws $l^1$ to ensure the jaws $l^2$ being meshed therewith. This arrangement readily permits the clutching of the low speed jaw clutch from rest which, if the jaws happened to be opposite one another, would in the absence of any clutch "drag", necessitate the parts being moved before they would mesh. The ports $hc$ and those controlled by the sleeve of the clutch $i$ are so arranged that the jaws are meshed before the sleeves uncover the ports as the transmission shaft, in both cases, is in motion during the clutching operations. The jaws of the clutches $l$ and $i$ may be formed as ratchet teeth to facilitate the meshing of each set of jaws when changing from a low speed or rest to a higher speed and to prevent them engaging until the speeds of the meshing jaws are nearly matched, when changing "down".

Before the jaw clutch $h$, $i$ or $l$ can commence to mesh fluid pressure sufficient to overcome spring 15 and to accelerate the sleeve $h^3$, $i^3$ or $l^3$ must be built up in passage $h^6$, $i^6$ or $l^6$ respectively. This pressure is immediately available, as it is being built up, to operate the "spinner" clutch $h^4$, $i^4$ or $l^4$ which, being much lighter in proportion to its area and having a very short travel, has time to sufficiently reduce the relative speed of the component parts of the corresponding jaw clutch.

To prevent any two jaw clutches engaging at the same time, the sleeve of the jaw clutch $h$ is provided with relief openings 38 adapted to register with similar openings formed in the transmission shaft and communicating with the other two passages $i^6$ and $l^6$. The intermediate and low gear clutch sleeves are similarly provided with relief openings adapted to relieve the passages $h^6$ and $l^6$; $h^6$ and $i^6$ respectively.

The clutches $h^4$, $i^4$ and $l^4$ are each provided with a small relief opening 39 which provides an escape for minute particles of dirt.

It is desirable to provide means for holding the low speed ratio clutch jaws $l^1$ and $l^2$ in mesh while maneuvering the vehicle. The cylinder $l^7$ is formed in a gear 40, the end of the sleeve $l^3$ remote from the jaws $l^2$ being turned down to fit the cylinder and to provide a shoulder 41. A sleeve 42, counterbored to receive both diameters of the sleeve $l^3$ engages the shoulder 41 and is shaped adjacent thereto to form an annular pocket 43. This pocket communicates with an opening $n^{12}$ formed in the sleeve $l^3$ and this opening is adapted to register with a port $n^{13}$ formed in the transmission shaft when the sleeve has been moved sufficiently to mesh the jaws of the clutch $l$. The port $n^{13}$ communicates with the passage $n^6$ so that when fluid under pressure is directed therethrough it will act against the shoulder 41 to maintain the jaws $l^1$ and $l^2$ in mesh after the pressure in the passage $l^6$ is cut off. The sleeve 42 is normally positioned, by means of a spring 44, on the sleeve 3 to engage the shoulder 41 thereof; this spring being much lighter than the spring 15. A small relief passage is formed in the sleeve 42 to prevent setting of the jaw clutch by leakage. Since sleeve $l^3$ covers port $n^{13}$ when the jaw clutch $l$ is fully disengaged there is no tendency for fluid in the passage $n^6$ to set this jaw clutch. It will be understood that the above arrangement is also applicable to the clutch $h$ should it be desired to establish a neutral position between high and intermediate speeds. It is obvious that both auxiliary jaw clutch cylinders might be fed from the same passage $n^6$ since the jaws must first be meshed before the auxiliary devices can operate.

To supply the passages with fluid I provide the rotary gear pumps 45 and 46 (see Figs. 1, 5 and 6) the former pump being driven by the engine shaft from the helical gear 35, the latter pump being driven by the gear 40 which is also a helical gear and is secured to the transmission shaft 3. With this arrangement a supply of liquid will always be available unless vehicle and engine are both at rest. The inlet openings of the pumps communicate with the interior of the transmission casing which contains the liquid. The outlet openings of the pumps communicate with opposite ends of a passage 47 having a safety valve 48 of common type located therein and adapted to spill the liquid into the casing when a certain pressure is reached. The passage 47 communicates with a vertical passage $47^a$ which leads to a manually operated valve of any suitable rotary type having a stem 49 adapted when turned to open the valve to spill the liquid from the feed passages back into the casing 5. To the valve stem is connected a lever E (see Fig. 12) adapted when set in a running position to close the spillway valve and adapted to open the latter when the lever is set in a neutral position.

To control the flow of liquid from the pumps a balanced valve adapted to be operated by means of a pedal lever 50 is provided, see Figs. 5, 6, 7, 8 and 9. In the valve body 51, secured to the side of the rear end $5^a$ of the casing 5, is slidably mounted a hollow plunger 52, which is provided with a pair of opposite slots 53 and $53^a$. The slot 53 is adapted to be brought into register with either one of a pair of ports $h^{14}$ or $i^{14}$ while the slot $53^a$ is adapted to register with a port $l^{14}$, these ports being formed in the valve body. These ports communicate, by means of passages $h^{15}$, $i^{15}$ and $l^{15}$, formed in the valve body and in the rear end $5^a$ of the transmission casing, with the annular grooves $h^{11}$, $i^{11}$ and $l^{11}$ formed in the bushing 13. The valve body is also provided with relief openings 54, $54^a$, $54^b$ which communicate with the interior of the transmission casing. The wall of the plunger is flattened to form recesses 55 which at all times are adapted to register with the relief openings 54 to drain the upper end of the valve body; the plunger is also flattened on the back at $55^a$ so as to provide relief for the "neutral" port, by way of recesses 55. The plunger adjacent its lower end is flattened at 56 and the recesses formed by these flats communicate with the openings $54^a$. The relief openings $54^b$ are adapted to drain the bottom of the valve body. The latter is provided with a feed opening $47^b$ communicating with the feed passage 47ª and, by means of a longitudinal slot 47ᶜ, with the interior of the hollow plunger 52. The plunger is normally maintained, by means of a compression spring 57 connected with the pedal lever 50, as hereinafter more fully described, in its high gear position with the slot 53 in register with the port $h^{14}$ whereby the liquid will be forced through the passage $h^{15}$, annular groove $h^{11}$, port $h^{10}$ and passage $h^6$ to operate the spinning and jaw clutches $h^4$ and $h$ and also the main clutch as hereinbefore described. When the plunger is raised, by pressing down on the pedal lever, to bring the slot 53 out of register with the port $h^{14}$ the liquid will be drained therefrom to destroy the pressure in its connecting passages, by means of the recesses formed by the flats 56 communicating with the port and the relief opening 54ª.

The wall of the plunger is provided with a slight depression 53ᵇ which communicates with the lower starting side of the slot 53ª the purpose of this is to enable the liquid to be gradually fed into the port $l^{14}$ which is the low speed port and is chiefly used for starting purposes. The fluid when the slot 53ª is in register with the port $l^{14}$ will be forced through the passage $l^{15}$, annular groove $l^{11}$, port $l^{10}$ and passage $l^6$ to operate the spinning and jaw clutches $l^4$ and $l$ and also the main clutch as hereinbefore described. When it is desired to move into second speed the slot 53 is registered with the port $i^{14}$ and the liquid will be forced through the passages, grooves and ports corresponding to those just described to operate the clutches $i^4$, $i$ and the main clutch. It will readily be seen that when either of the slots 53 or 53ª are in register with a port that the other ports will be drained by either of the relief recesses 55 or 56.

The different positions of the pedal C on the lever 50, which is fulcrumed on the transverse shaft 22, are shown in Fig. 5. When the pedal is depressed to the neutral position the slots 53 and 53ª are raised above the port $l^{14}$ and the feed slot 47ᶜ registers with a port $n^{14}$ formed in the valve body. This port communicates by means of a passage $n^{15}$ in the valve body and casing 5 with the annular groove $n^{11}$ formed in the bushing 13 and is adapted to feed liquid to the passage $n^6$. The upper end of the feed slot 47ᶜ is adapted to still communicate with the port $n^{14}$ until the plunger has been lowered to bring the slot 53ª into register with the port $l^{14}$ but the communication with the port $n^{14}$ is cut off when the slot 53ª is lowered into complete register with the port $l^{14}$.

The pedal lever 50 has a pin and slot connection with the upper end of the plunger 52 and to vertically adjust the latter relative to the valve body so that the slot 53 will normally register with the port $h^{14}$, a bolt 58 fulcrumed on a suitable stationary part passes through a lateral projection formed or carried on the lever 50. This bolt and its connection with the lever is shown and described in detail in my co-pending application hereinbefore mentioned. The spring 57 is disposed on this bolt and one end thereof acts against the underside of the lever 50 while the other end engages a washer adjustably carried on the bolt. To give an indication to the operator when the plunger 52 is positioned with the slot 53ª in register with the port $l^{14}$, (low gear position) a second spring 59 is provided. This spring is also disposed on the bolt and described in detail in the prior application and it is adapted to be "picked up" just as the plunger is fully in the low gear position. The second or intermediate gear position is indicated by a "click" formed by a spring actuated plunger 60 mounted in the valve body 51 and adapted to engage an indentation 60ª formed in the plunger 52.

The arm, link and lever arrangement 21 secured to the transverse shaft 22 for shifting the gear 18 into mesh with the low speed forward drive gear $l^5$ or with the reverse idler gear 19 is operated by a foot pedal R secured to or formed on a lever 61. This lever is journalled on the transverse shaft and is also adapted to simultaneously position the plunger 52 in its low speed position when the shift gear 18 is meshed with the idler. This is accomplished by a second lever 62, secured to the shaft 22, one end thereof having a resilient connection 63 with the lever 61, the purpose of this connection is to enable the R pedal to be depressed relative to the lever 62 to apply the brakes as hereinafter described. The other end of the lever 62 is adapted to engage a set screw 64 threaded in a lug formed on the lever 50. With this construction it is evident that by depressing the pedal R and thus the lever 61 that the lever 62 will be rocked and thus the shaft 22 to actuate the arm, link and lever 21 to mesh the gear 18 with the idler 19 and at the same time the lever 62 will engage the set screw and thus actuate the lever 50 to position the plunger 52 in its low gear position. This set screw adjustment will not permit the plunger being moved into its intermediate or high gear position while the gear 18 is in mesh with the idler gear. The reverse pedal lever is normally held in its "forward" position by a spring $R^2$.

To apply the brakes to the vehicle and to automatically apply them should the engine stop or should the vehicle back down a hill, I provide a brake cylinder $b$ secured to the side of the casing 5. In the cylinder is mounted a piston $b^1$ provided with a piston rod $b^2$ connected with a lever $b^3$ (see Figs. 10, 11, 12, 5 and 6) to which is connected the brake rods $b^4$ which are connected to the brakes (not shown). A spring or springs $b^5$ connected with the lever $b^3$ and a suitable stationary part of the vehicle are adapted to rock the lever to apply the brakes. The brakes are normally held in their off position, when the engine is running, by means of fluid under pressure acting against the piston $b^1$ to rock the lever $b^3$ against the tension of the springs $b^5$. Communicating with the end of the cylinder remote from the piston rod is a duct $b^6$ which also communicates with an annular groove $b^7$ formed in a valve chamber $b^8$ formed on or secured at the top of the brake cylinder. In this chamber is mounted a slide valve $b^9$ which is turned down intermediate its ends to form an annular recess $b^{10}$. An inlet passage $b^{11}$ formed in the body of the chamber forms a communication between the latter, and the feed passage $47^a$ and this passage communicates with the recess $b^{10}$ so that equal pressure is applied to both ends of the valve. Referring particularly to Figs. 10 and 11 it will be noted that an exhaust opening $b^{12}$ is formed at one end of the chamber and a relief opening $b^{13}$ at the other end thereof. These openings and another relief opening $b^{20}$ formed in the cylinder $b$ communicate with the interior of the casing 5. From the above description it is evident that by shifting the valve to the right that the inlet passage $b^{11}$ will communicate with the duct $b^6$ and by shifting the valve to the left the duct will communicate with the exhaust opening $b^{12}$ to thus supply fluid to the cylinder $b$ to hold off the brakes or permit the springs $b^5$ to act on the plunger to force the fluid from the cylinder and thus apply the brakes.

To control the brakes I provide a pedal lever B fulcrumed on the shaft 22. To this lever is pivotally connected a link $b^{14}$ which passes through one arm of a bell crank lever $b^{15}$ and has adjusting nuts threaded thereon for engagement with the bell crank. The latter is fulcrumed on the cylinder $b$ and to its other arm is pivotally connected a link $b^{16}$ which is pivotally connected at $b^{17}$ to a lever $b^{18}$. One end of this lever is pivotally connected with the rod of the valve $b^9$ while the other end of the lever has a pin and slot connection with the piston rod $b^2$. In Fig. 10 the parts are shown in position to hold the brake off, while in Fig. 5 the parts are shown in their positions with the vehicle at rest and with the brake on since there is no liquid pressure.

A spring $B^2$ normally holds the pedal lever B in its inoperative position with the brakes off. A spring $b^{19}$ disposed on the link $b^{14}$ engages a suitable part carried thereby and also the arm of the bell crank opposite the adjusting nuts to form a resilient connection between the bell crank and the link for a purpose which will hereinafter appear.

From the above description it is evident that, by depressing the pedal lever B, the fulcrum point $b^{17}$ will be shifted to the left, in Fig. 10, to thus move the valve $b^9$ and establish a communication between the duct $b^6$ and exhaust port $b^{12}$. The springs $b^5$ then force the piston $b^1$ towards the duct which forces some of the liquid therein through the exhaust port. This movement of the piston causes the lever $b^{18}$ to be rocked in the opposite direction, on its fulcrum, to shift the valve to its duct-closing position. If the pedal lever is only slightly depressed the automatic equalizing arrangement just described permits only a small amount of the liquid being exhausted from the brake cylinder and thus the brakes are only slightly applied. If more braking action is required the pedal lever is further depressed which causes the above described cycle of operations to be repeated. The farther the foot pedal is depressed, the longer the stroke of the valve $b^9$ and the greater the volume of liquid exhausted from the brake cylinder. When the operator's foot is removed from the pedal the spring $B^2$ returns the pedal lever B to its normal position and rocks the bell crank to shift the fulcrum $b^{17}$ which shifts the valve $b^9$ (Fig. 10) to the right and forms a communication between the inlet port $b^{11}$ and the duct $b^6$ which permits fluid to flow into the brake cylinder. This fluid acts on the piston $b^1$ and as the cylinder is filling the lever $b^{18}$ is being swung, by means of its pin and slot connection with the piston rod $b^2$, to the right, see Fig. 5. This causes the valve to move to the left towards its position for closing the duct $b^6$ but the pedal is so adjusted as to leave a sufficient opening to hold the brakes fully off. Any leakage past the piston is drained by the relief opening $b^{20}$ and this leakage is automatically replaced by the valve shifting slightly to admit fluid in the duct. It is thus obvious that the operation of the pedal lever B is identical with the operation of an ordinary brake lever in which the brakes are manually operated. In the previous fluid pressure brake mechanisms it is necessary to intermittently move the brake pedal to its on and off positions, otherwise the brakes will lock and the vehicle will stop so suddenly the occupants thereof will be pitched forward.

To hold off the brakes when it is desired to move or tow the vehicle, without running the engine to supply fluid to the brake cylinder, I provide a manually operated ratchet toothed sector 65 (see Fig. 12) suitably pivoted on a part of the vehicle. This sector is connected, by means of a flexible connection 66, with the end of the lever $b^3$ remote from the brake springs $b^5$ and rods $b^4$. A pawl 67 carried on the end of a socket 68 which is pivoted on a part of the vehicle and adapted to receive an end of a tool (not shown) is adapted to pick the sector 65 and thus rock the lever $b^3$ against the tension of the springs $b^5$. A pivoted dog 69 shaped as a bell crank is adapted to engage the teeth of the sector to releasably lock the lever in position for holding off the brakes.

The hand lever E hereinbefore described as connected with the spillway valve stem 49 is also suitably connected with the emergency brakes (not shown) the position of the lever for applying these brakes being indicated at $E^B$ in Fig. 12. The neutral position of this lever is indicated in full lines and in this position the spillway valve is opened. The position of the lever when the vehicle is to be started and when it is in motion is also indicated at $E^R$ and in this position the spillway valve is closed. The lever E is releasably locked in its neutral or brake applying positions by a spring actuated dog 70 carried by the lever and adapted to engage a toothed quadrant 71 carried by the vehicle.

To ensure the brakes are not held off when the lever E is moved to its "running" position the lever is provided with a projection 72 adapted to engage a pivoted arm 73 connected by means of a link 74 with the dog 69. This arrangement, when the lever E is swung to its running position, causes the dog 69 to be released from the teeth of the sector and thus causes the brake applying springs to come under the action of the brake cylinder $b$.

It is desirable, when the operator is using the reverse pedal R and lever 61, to cause the vehicle to be backed up, to also use this pedal to apply the brakes instead of using both the pedals R and B. For this purpose the end of the lever 61, remote from the pedal R, is pivotally connected with a link $r$ which passes through the same arm of the bell crank lever $b^{15}$ that the link $b^{14}$ passes through. The link $r$ is provided with adjusting nuts for engagement with the bell crank; sufficient lost motion is provided between the nuts and the crank to enable the pedal R to first be moved so as to fully shift the gear 18. The connection 63 between the reverse pedal lever 61 and the lever 62, hereinbefore mentioned, is formed so that the lever 61 may be depressed relative to the lever 62 when it is desired to apply the brakes. This connection comprises a bolt which passes through the lever 62 and a lug $r^1$ formed on the side of the lever 61. A spring $r^2$, disposed on the bolt, has one end in engagement with the lug and the other end in engagement with a nut threaded on the end of the bolt. It will be noted that the severity of the brake application is proportioned to the travel of the reverse pedal R after the spring $r^2$ has been picked up. This corresponds with the brake action attained by the use of the regular brake pedal B.

It will be noted that all the bearings have lubricating openings communicating with the adjacent feed passages and a return conduit 72 for draining the rear end of the bushing 13 is provided. The transmission casing 5 is provided with a transverse wall or partition 73 forming the casing into two compartments, one for the countershaft and speed change gears and their clutches and the other for the main clutch. The conduit 72 communicates with the last mentioned compartment which has a lower fluid level than the first compartment and any suitable pump, such as the flywheel teeth running in a channel, may be used for feeding the fluid from the second compartment to the first.

The mode of operation, assuming the engine is running and the lever E in neutral position and it is desired to drive the vehicle forward, is as follows. The pedal C on the lever 50 is first fully depressed to the neutral position, and the lever E is set at "running" position to close the spillway valve. The pedal C is then permitted to be gradually raised by the springs 57 and 59 until the latter spring is "dropped" and the plunger 52 is lowered into low gear position to feed fluid to the clutches $l$ and $l^4$ and thus to the passage $c^2$ to feed the main clutch after the jaw clutch $l$ is meshed. The vehicle now moves off and the next operation is to permit the pedal C to be raised, by the spring 57, until notch device on valve body engages, which engagement is felt by the operator's foot and indicates the intermediate gear position. The foot pedal is then fully released to allow the plunger 52 to be lowered into high gear position in which position it is normally maintained by the spring 57. These operations are reversed to obtain low speed and neutral. When temporarily stopping the vehicle after travelling in low gear, the plunger is raised to its neutral position to register the feed slot $47^c$ with the port $n^{14}$ which directs the fluid to hold the low speed clutch jaws in mesh and destroys the pressure to the main clutch. The plunger in this position will hold the jaws in engagement after they have been engaged but, as hereinbefore described, the pressure fluid in the passage $n^6$ will otherwise have no effect on the jaws $l^2$.

The brakes are applied by simply pressing the foot on the pedal B, the distance the pedal is pushed down corresponds with the brake rod travel. It will be understood that the brake cylinder will be refilled, when the engine is running or car is moving ahead, immediately the foot is removed from the pedal B, to again hold off the brakes.

To back up the vehicle, after having depressed the pedal C and set the lever E to running position, the foot is shifted to the pedal R which is depressed, and with it levers 61 and 62, until the added resistance of the spring $r^2$ is felt, which indicates the full reverse position. The pedal C is then permitted to be raised as for low gear. It is prevented from coming farther, by the reverse arm 62.

To apply the brakes after the car has been backed sufficiently, it is merely necessary to further depress the pedal R the amount necessary to get the desired braking effect.

What I claim is:—

1. The combination of a driving element; a driven element; a clutch shaft; a main clutch for connecting the driving element with the clutch shaft; a countershaft having a driving connection with said clutch shaft; change speed gearing including a plurality of gears journalled on said driven element; a plurality of clutches, one being adapted to connect the said clutch shaft with the driven element and the others adapted for connecting the said gears with the driven element; and means for actuating any one of the driven element clutches, each of the said driven element clutches being adapted to control the operation of the said main clutch whereby the latter will not be actuated before a driven element clutch is actuated.

2. The combination of a driving element; a driven element; a clutch shaft; a main clutch for connecting the driving element with the clutch shaft; a countershaft having a driving connection with said clutch shaft; change speed gearing including a plurality of gears journalled on said driven element; a plurality of toothed clutches, one being adapted to connect the said clutch shaft with the driven element and the others adapted for connecting the gears with the driven element; and means for acutating any one of the toothed clutches, each toothed clutch being adapted to control the operation of the said main clutch to ensure the meshing of the clutch teeth before the main clutch is actuated.

3. The combination of a driving element; a driven element; a clutch shaft; a main clutch for connecting the driving element with the clutch shaft; a countershaft having a driving connection with the clutch shaft; a set of change speed gears including a gear journalled on said driven element; a toothed clutch for connecting the clutch shaft with the driven element; a second toothed clutch for connecting the said gear with the driven element; a spinning clutch for rotating the clutch shaft by the driven element to facilitate the meshing of the teeth in the first toothed clutch; and means for actuating the first mentioned tooth clutch and the spinning clutch or the second clutch in conjunction with the main clutch.

4. Apparatus as set forth in claim 3 in which each of the toothed clutches control the operation of the main clutch to ensure the meshing of the clutch teeth before the main clutch is actuated.

5. Apparatus constructed as set forth in claim 1 in which each of the toothed clutches is provided with a spinning clutch connected with the driven element for matching the speeds of the clutch teeth and in which the clutch actuating means also actuates the spinning clutch simultaneously with the toothed clutch connected thereto.

6. The combination of a driving element; a driven element; a clutch shaft; a main clutch for connecting the driving element with the clutch shaft; a countershaft having a driving connection with the clutch shaft; a set of change speed gears including a gear journalled on said driven element; a toothed clutch for connecting the clutch shaft with the driven element; a second toothed clutch for connecting the said gear with the driven element; a spinning clutch for rotating the clutch shaft by the driven element to facilitate the meshing of the teeth in the first toothed clutch; and fluid pressure means for actuating the first mentioned tooth clutch and the spinning clutch or the second clutch in conjunction with the main clutch.

7. The combination of a driving element; a driven element; a clutch shaft; a fluid operated main clutch for connecting the driving element with the clutch shaft; speed change gears having a driving connection with the clutch shaft and having a plurality of gears journalled on the driven element; a plurality of fluid operated toothed clutches, one being adapted to connect the clutch shaft with the driven element and the others for connecting the said gears with the driven element; a fluid conduit for each toothed clutch; a passage communicating with the main clutch and with the interior of each toothed clutch and normally closed by the clutch; and means for supplying fluid under pressure to any desired conduit to actuate the toothed clutch communicating therewith and thereby establish a communication between the conduit and the passage to actuate the main clutch.

8. The combination of a driving element; a driven element; a clutch shaft; a main clutch for connecting the driving element with the clutch shaft; a toothed clutch for connecting the clutch shaft with the driven element, the toothed clutch being adapted to control the operation of the main clutch to ensure the meshing of the clutch teeth before the main clutch is actuated; fluid pressure means including a single actuating device for actuating the toothed clutch and thereby actuate the main clutch to connect the driving and driven elements; and means adapted to hold the teeth of the toothed clutch in engagement after they have been meshed and operable by the actuating means when the single actuating device is operated to cut off the fluid pressure to the toothed clutch and thus to the main clutch.

9. The combination of a driving element; a driven element; change speed gears; a clutch for connecting the change speed gears with the driving element; means for forming a drive connection between the change speed gears and the driven element; reverse gearing for changing the direction of rotation of the driven element; fluid pressure means including a single actuating device for actuating the drive connecting means; and means including a single actuating lever for simultaneously operating the reverse gearing and retaining the said actuating device in position to actuate the drive connecting means.

10. The combination of a driving element; a driven element; change speed gears; a clutch for connecting the change speed gears with the driving element; means for forming a drive connection between the change speed gears and the driven element; reverse gearing for changing the direction of rotation of the driven element; fluid pressure means including a single actuating device for actuating the drive connecting means; a brake; spring means tending to apply the brake; and means for supplying fluid under pressure to control the operation of the brake; and means for operating the reverse gearing and adapted to actuate the brake controlling means.

11. The combination of a driving element; a driven element; a clutch shaft; a fluid operated clutch for connecting the clutch shaft with the driving element; a toothed clutch for connecting the clutch shaft with the driven element and comprising a member having a plurality of teeth; a plunger having a plurality of teeth adapted to mesh with the first teeth; a cylinder adapted to slidably receive the plunger; a sleeve slidably mounted on the plunger; an annular chamber formed between the plunger and the sleeve; a conduit connected with the cylinder; a port communicating with the annular chamber, the communication being normally closed by the said plunger; a second conduit communicating with the port; a third conduit communicating with the first clutch and the cylinder of the second clutch, the communication being normally closed by the said plunger; and means for supplying pressure fluid to the first conduit for actuating the plunger to mesh the clutch teeth and to uncover the port and the communication to permit the fluid to actuate the first clutch, the said means being adapted to direct fluid under pressure to the third conduit to hold the teeth in mesh when the pressure is removed from the first conduit.

12. The combination of a driving element; a driven element; a clutch shaft; a fluid operated clutch for connecting the clutch shaft with the driving element; a countershaft having a driving connection with said clutch shaft; change speed gearing including a plurality of gears journalled on said driven element; a plurality of fluid operated clutches, one being adapted to connect the said clutch shaft with the driven element and the others adapted for connecting the said gears with the driven element; a conduit for each of the said plurality of clutches; a passage communicating with the first clutch and with the interior of each of the other clutches, the communications with the clutches being normally closed thereby; and means for supplying fluid under pressure to any desired conduit to actuate the clutch communicating therewith and to establish a communication between the conduit and the passage to actuate the first mentioned clutch, each of the plurality of clutches being adapted when actuated to spill the liquid from the other clutch conduits.

13. The combination of a driving element; a driven element; a clutch shaft; a fluid operated clutch for connecting the clutch shaft with the driving element; a countershaft having a driving connection with said clutch shaft; change speed gearing including a plurality of gears journalled on said driven element; a plurality of fluid operated toothed clutches, one being adapted to connect the said clutch shaft with the driven element and the others adapted for connecting the said gears with the driven element; a conduit for each of the said plurality of clutches; a passage communicating with the first clutch and with the interior of each of the other clutches, the communications with the clutches being normally closed thereby; and means for supplying fluid under pressure to any desired conduit to actuate the clutch communicating therewith and to establish a communication between the conduit and the passage to actuate the first mentioned clutch, one of the said plurality of toothed clutches being adapted to admit fluid to the passage immediately the clutch is actuated, the other toothed clutches being adapted to admit fluid to the passage when the teeth are meshed.

14. Apparatus constructed as set forth in claim 2 in which one of the toothed clutches is provided with a spinning clutch connected with the driven element for matching the speeds of the clutch teeth and in which the clutch actuating means also actuates the spinning clutch simultaneously with the toothed clutch connected therewith, the toothed clutch having the spinning clutch connected therewith being provided with spring means tending to hold the teeth out of mesh and thus slightly delaying the meshing of the teeth to permit the spinning clutch to be actuated first.

15. The combination of a driving element; a driven element; change speed gears; a clutch for connecting the change speed gears with the driving element; means for forming a drive connection between the change speed gears and the driven element; reverse gearing for changing the direction of rotation of the driven element; a brake; means tending to apply the brake; fluid pressure means for actuating the drive connecting means and for normally maintaining the brake applying means out of action, the said fluid pressure means including a cylinder and a lever for controlling the operation of the brake; means for regulating the exit of fluid from the cylinder in proportion to the travel of the lever; and means including a lever for simultaneously operating the reverse gearing and retaining the said actuating device in an operative position and adapted to actuate the brake controlling means.

16. The combination of a driving element; a driven element; a clutch shaft; a main clutch for connecting the driving element with the clutch shaft; a countershaft having a driving connection with said clutch shaft; change speed gearing including a plurality of gears journalled on said driven element; a plurality of clutches, one being adapted to connect the said clutch shaft with the driven element and the others adapted for connecting the said gears with the driven element; and a single actuating device for actuating any one of the driven element clutches, each of the said driven element clutches being adapted to control the operation of the said main clutch whereby the latter will not be actuated before a driven element clutch is actuated.

Signed at Toronto, Canada, this 14th day of October 1924.

MAUNSELL B. JACKSON.